United States Patent [19]

White

[11] 4,121,882
[45] Oct. 24, 1978

[54] FLAT SCAN HOLOGRAPHIC LASER BEAM DEFLECTOR

[75] Inventor: James M. White, Mahopac, N.Y.

[73] Assignee: International Business Machines Corporation, Armonk, N.Y.

[21] Appl. No.: 755,292

[22] Filed: Dec. 29, 1976

[51] Int. Cl.$^2$ .................. G03H 1/04; G02B 27/17
[52] U.S. Cl. ...................................... 350/3.71; 350/6.1
[58] Field of Search .................. 350/3.5, 6, 7, 3.71, 350/6.1, 6.2

[56] References Cited

PUBLICATIONS

Bryndahl et al., Applied Optics, vol. 15, No. 1, Jan. 1976, pp. 183–194.
Pole et al., Applied Optics, vol. 14, No. 4, Apr. 1975, pp. 976–980.

*Primary Examiner*—Ronald J. Stern
*Attorney, Agent, or Firm*—Pollock, Vande Sande & Priddy

[57] ABSTRACT

A holographic laser beam deflector has an approximately flat field scan. The scan is produced by illuminating a rotating hologram on a circular surface by a laser beam. The virtual source of the illuminating beam is offset from the center of rotation of the hologram. The hologram is produced by interference of a pair of coherent laser beams, each beam having a source or virtual source on a line containing the rotational center of the surface of the hologram, one source or virtual source outside the surface, the other inside. The virtual source for the inside beam is also displaced from the center of rotation.

13 Claims, 7 Drawing Figures

FLAT SCAN HOLOGRAPHIC LASER BEAM DEFLECTOR

FIELD OF THE INVENTION

The present invention relates to light beam deflecting devices for producing a scanning light beam.

BACKGROUND OF THE INVENTION

Since successful industrial application of lasers is strongly dependent upon the success of light deflection technology, much effort has been directed at this problem. The results of this effort can be generally broken down into two classes, acoustic deflectors and mechanical deflectors. The acoustic deflectors are limited in spatial spanning capacity whereas the mechanical deflectors are limited in speed. A disclosure of a mechanical deflector employing a multi-faceted rotating polygon was found in the recently-issued U.S. Pat. No. 3,995,110.

In August of 1974 Pole et al disclosed a holographic laser beam deflector (IBM Research Paper RJ 1423). This deflector comprises several transmission type volume holograms recorded on a cylindrical surface. A reconstructing laser beam having a virtual source at the center of rotation of the cylinder illuminates the hologram which then deflects the illuminating beam in a scanning type motion. The deflecting hologram is produced through the interference of a pair of coherent laser beams at a cylindrical surface having rotational symmetry with respect to an axis containing the origin of one of the beams. For deflection purposes, the illuminating source, also located at the center of symmetry, has a reduced aperture, and the hologram produces a scanning light beam as the cylindrical surface is rotated.

There are a number of parameters which determine the utility of a deflector of this sort, one of which is the resolution of the resulting scanning beams, i.e., how many different resolvable spots can be produced in a given scan field?

One difficulty inherent in the Pole et al approach is that since the co-action of hologram and illuminating beam is to recreate the object beam, the scan field traces out a circle, or circular arc, as the hologram rotates. While for some applications such a scanning field is desirable, the typical scanning application requires a flat or nearly flat field scan. The circular scan of the Pole et al device can, of course, be corrected by optics, but this is only at the expense of resolution and/or scan width.

It is therefore one object of the present invention to provide a light deflector having the advantages of the Pole et al device, while, at the same time, producing a flat field or nearly flat field scan. It is another object of the present invention to provide a holographic light deflector which illustrates increased resolution over the prior art holographic light deflectors, such as computer generated holograms. It is another object of the present invention to provide a light deflector having advantages of prior art holographic light deflectors while, at the same time, providing for flat or nearly flat field scan.

SUMMARY OF THE INVENTION

The present invention meets these and other objects of the invention by providing a cylindrical drum having at least a transparent segment and means for rotating the drum about its central axis. A hologram is mounted on said transparent segment and a laser light beam illuminates the hologram, the laser beam having a virtual source on a line intersecting the axis of said cylindrical drum, but spaced from said axis along said line.

The hologram is produced by providing a cylindrical drum having at least a transparent segment, and providing in said transparent segment a photosensitive material for the recording of a hologram. A pair of light beams impinge on the photosensitive material, and the interference between these beams produces the hologram. A first beam has a virtual source outside the cylindrical drum, and a second beam has a virtual source inside the cylindrical drum, both virtual sources located on a line passing through the drum axis. The light beam having its virtual source inside the drum is, however, offset from the cylindrical axis.

By providing plural transparent segments and recording a hologram on each, plural deflecting holograms are provided in a band around the cylinder.

An illuminating beam of reduced aperture, compared to the recording beam illuminates the holograms as the drum turns. The holograms deflect the illuminating beam, scanning the width of the field for each hologram.

By selecting the offset from the cylindrical axis, of both recording and illuminating beam, a flat or nearly flat field scan is produced.

BRIEF DESCRIPTION OF THE DRAWINGS

The present invention will be disclosed in further detail in the following portions of this application when taken in conjunction with the attached drawings in which.

DETAILED DESCRIPTION OF THE INVENTION

Figure 1:
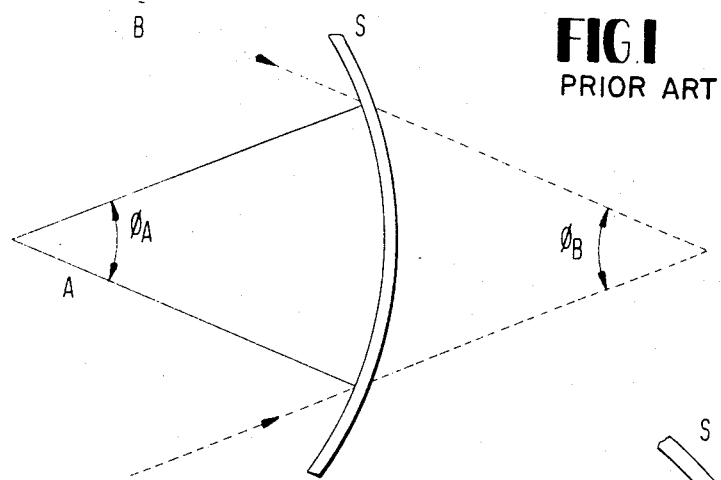
FIGS. 1–4 illustrate recording and reconstruction as disclosed by Pole et al, which has aspects in common with this invention.
Figure 2:
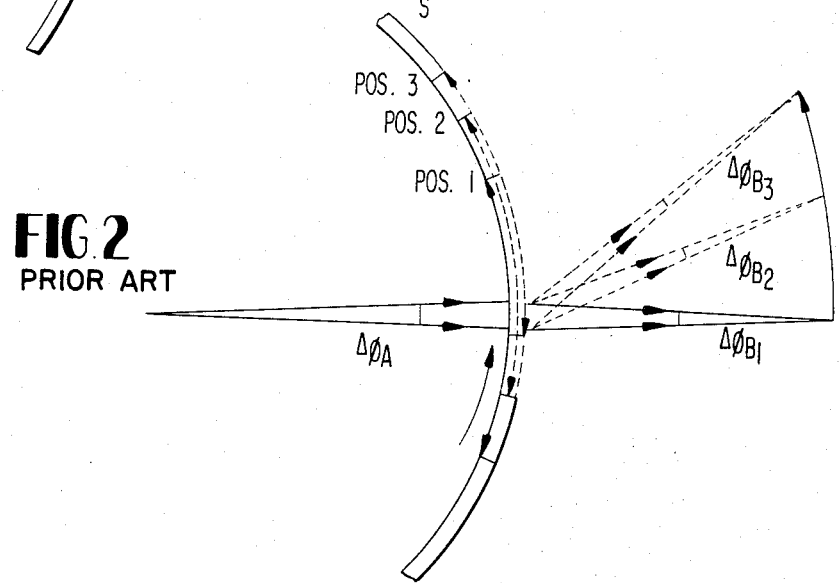

FIG. 1 illustrates the recording geometry disclosed by Pole et al. More particularly, two coherent beams of light A and B impinge upon a cylindrical surface S, having rotational symmetry. The beam A is a divergent beam having an aperture $\phi_A$ and the beam B is a convergent beam of aperture $\phi_B$. Of course, the beam B could also be a divergent beam of the same aperture if the source is located exterior to the surface. If the surface S is photosensitive material, sensitive to the wavelength of the beams A and B, then a hologram will be recorded on this surface having the property that when illuminated by the beam A, the beam B will be reconstructed and vice versa. For the purposes of developing a light scan, however, the hologram recorded as shown in FIG. 1 is illuminated as shown in FIG. 2, by a reference beam A having an aperture $\Delta\phi_A$, which is only a fraction of the original aperture $\phi_A$. The result will be reconstruction of only an angular fraction $\Delta\phi_B$ of the original beam B. If the hologram is now moved from position 1 to position 2, along the surface S, the fractional cone $\Delta\phi_{B2}$ will be reconstructed, instead of the originally reconstructed cone $\Delta\phi_{B1}$, and, as the hologram is moved to position 3, the beam $\Delta\phi_{B3}$ will be constructed. Thus, the rotation of the hologram about its axis when illuminated by beam A of aperture $\Delta\phi_A$ will produce an angularly scanning cone of light.

Figure 3:
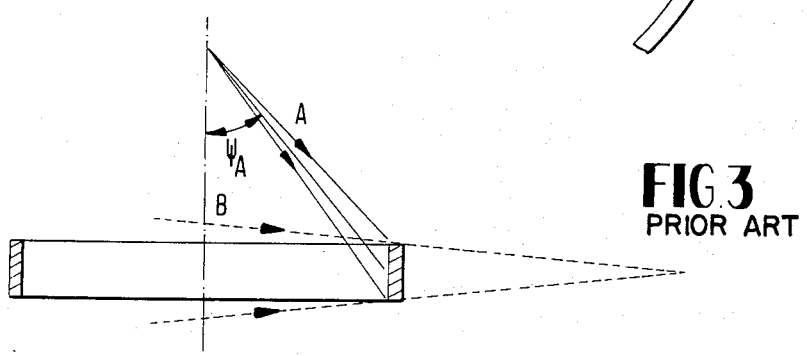

In order to prevent formation of a zero order beam, the beams A and B can be offset, as shown in the cross-section of FIG. 3.

Figure 4:
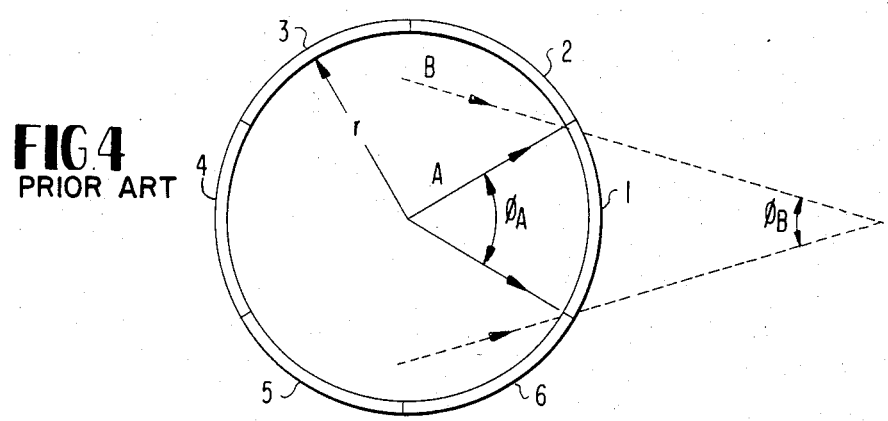

FIG. 4 illustrates how several different holograms are recorded on the surface S by rotating the surface to several discrete positions. Six different holograms are illustratively shown.

Figure 5:
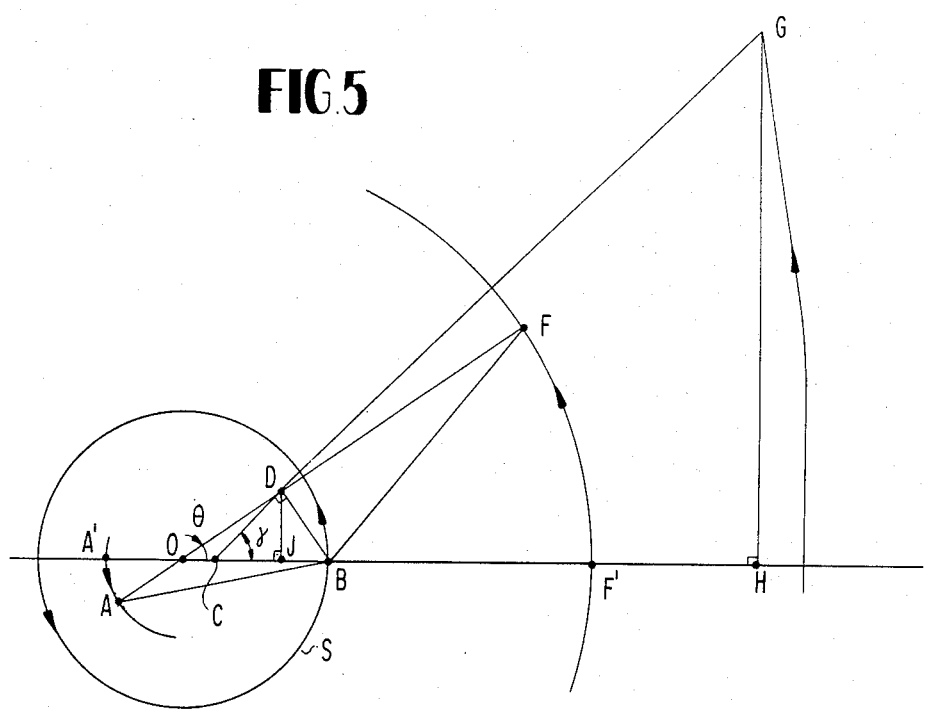
FIG. 5 illustrates the relative location of recording and reconstruction sources and the scan field resulting therefrom.

The principles of the present invention will be disclosed with reference to FIG. 5 wherein the hologram conforms to the surface S, which has rotational symmetry about the center O. One of the holograms can be produced by employing two coherent sources, one having a virtual source at A', and the second having a virtual source F'. As is illustrated in FIG. 5, these sources exist on a line passing through the center of rotational symmetry although each source is displaced from the rotational center of symmetry. In common witj Pole et al, each recording source has an aperture to illuminate the entire hologram which forms a segment of a cylindrical band. Now, instead of locating the reconstruction source at the center of symmetry O, we locate the reconstruction source at C, and allow the hologram to rotate through an angle $\theta$. At the same time, we restrict the aperture of the light illuminating the hologram to a small cone passing through the region at B. The reconstruction light will be focused at point G. The location of G may be determined by considering the hologram as a thin lens whose center is at D (for a given element of the hologram at B) and whose focal length is given by $1/AD + 1/DF = 1/CD + 1/DG$.

Figure 7:
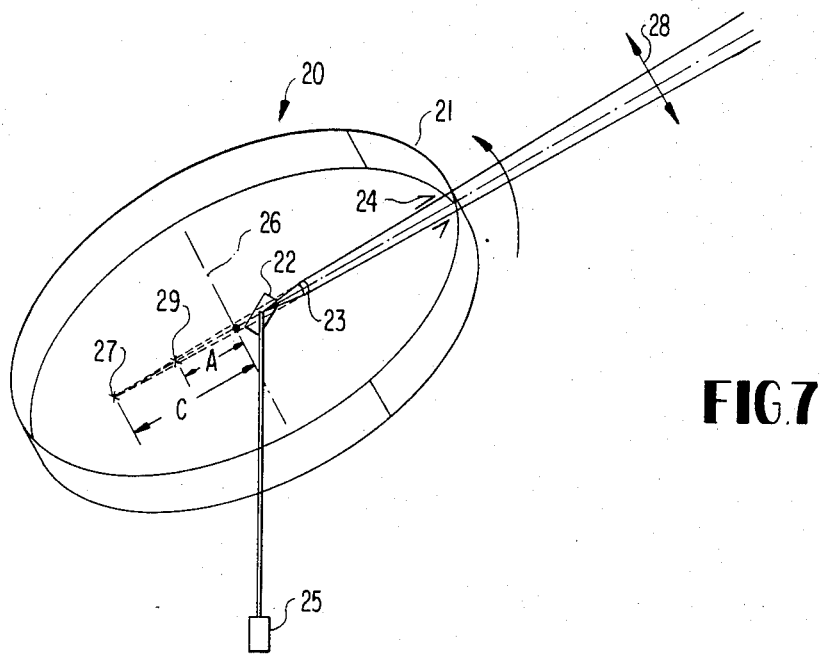
FIG. 7 is a schematic showing of a practical scanning system employing the invention.
Figure 6:
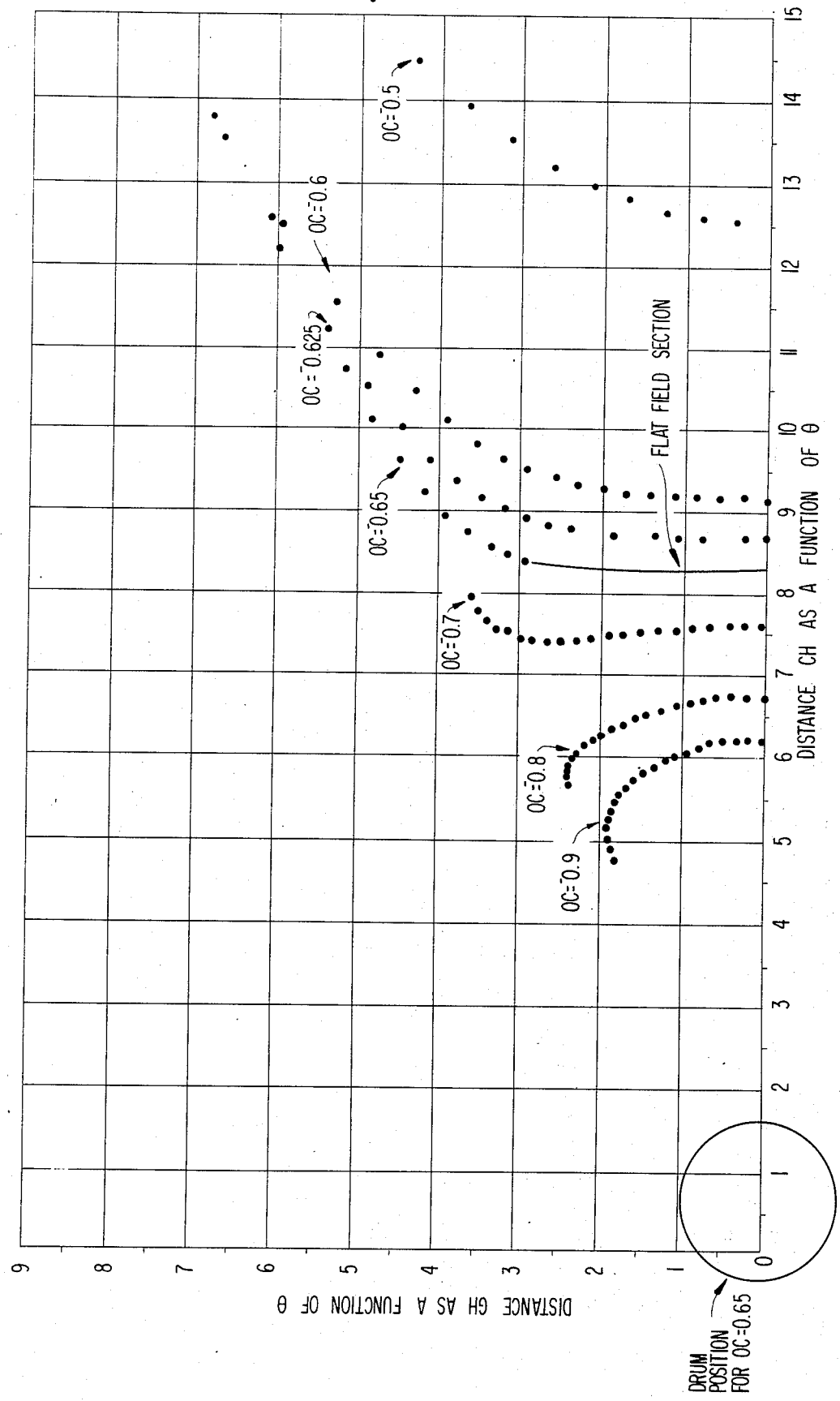
FIG. 6 is a graphical showing of how the resulting scan fields change with changes in a selected parameter.

If we solve that equation for several different angles $\theta$, we find that for selected parameters of OC we can obtain a flat or nearly flat field. For example, FIG. 6 shows the movement of the point G, as $\theta$ varies, given that OB, OF, and OA are fixed, and allowing OC to vary. OC is, of course, the offset of the reconstruction light source or virtual source from the center of symmetry. FIG. 6 is computed for the normalized values OB = 1, OF = 12, and OA = 0.5. OB corresponds to drum radius, OA to the offset rotational symmetry of one recording source and OF is the distance from rotational center of the second recording source. As shown in FIG. 5, positive OC refers to an offset to the right and negative OC refers to an offset to the left. As shown in FIG. 6, for the value of OC = −0.65, there is a region within which CH varies by less than ± 0.05, which region has a half width of about 2.75. CH (as shown in FIG. 5) is the distance from the scan field to the reconstruction source. Within practical tolerances, and with good resolution, this is a flat field of scan. FIG. 7 illustrates a practical physical arrangement to achieve flat field of scanning from a holographic deflector.

FIG. 7 shows a band 20 of a rotatable drum (not illustrated) which band 20 includes several transparent portions. Overlying one of the transparent portions is a hologram 21, the production of which will be discussed hereinafter. The drum rotates about an axis 26. A source of collimated light, such as that derived from laser 25, is directed at a mirror 22, from which the light beam passes through a diverging lens 23. The diverging lens 23 is selected and positioned so that the virtual source of light exiting from the lens 23 is located at an off-axis point 27. Aperture stops, such as stops 24, may also be mounted in a fixed position as illustrated in FIG. 7. As the drum rotates, the hologram produces a flat field scan, for example, in the field 28. In a particular example, the laser emits at 633 nm. and the virtual source for the light 27 is located 65 mm. off the drum axis. The drum has a radius of 100 mm. and the stops 24 are arranged to produce a 2.24 mm. aperture. For a hologram which occupies 0.5 radians, when produced in accordance with the following description, a 250 mm. wide scan field will be produced 658 mm. from the hologram.

To produce the hologram 21 which, when mounted in the structure illustrated above, will produce the desired flat field scan, the aperture of the laser beam emitted by laser 25 and the lens 23 are selected so that the laser 25 illuminates the 0.5 radian unexposed hologram with a virtual source at a point 29 located 15 mm. off the drum axis. In addition, a second source, coherent with the laser 25, is also arranged to illuminate the 0.5 radian hologram segment and located along the line including the points 27 and 29 and 1100 mm. from the transparent drum surface.

With the parameters given above, it is estimated that 250 mm. scan field would include 790 resolvable positions.

To provide for repetitive scanning of the field 28, multiple holograms are located in the band 20 around the drum surface. As the drum is rotated this entire field is scanned once per segment, and if the object located in the scan field is indexed, or incremented (for example, vertically, if the scan is horizontal) then each different holographic segment provides a different line scan. The aperture stop referred to above is selected so that the diffraction limit and aberration contribution to resolution degradation is equal in order to optimize the design.

What is claimed is:

1. A flat field scanning device to provide an essentially flat field scan comprising:
   a circular cylindrical drum having at least a transparent segment and means for rotating said drum about its central axis,
   a hologram mounted on each said transparent segment of said drum, and
   light source means of wavelength equal to wavelength of beams employed to produce said hologram for illuminating said hologram, said light source means having a virtual source within said drum located on a line perpendicular to, and intersecting said axis, said virtual source spaced on said line from said axis.

2. The apparatus of claim 1 wherein,
   said hologram is produced by interfering coherent light beams each with a virtual source, at least one of said virtual sources lying inside said drum and offset from said drum axis.

3. The apparatus of claim 1 wherein said light source means comprises a laser means and lens, said laser means directing a light beam to said lens, said lens selected and located to provide said virtual source.

4. The apparatus of claim 3 which further includes aperture stop means to limit said light beam impinging on said hologram.

5. The apparatus of claim 4 in which said aperture stop means is located to provide a diffraction limit to beam resolution in said scan field equal to aberration limit to beam resolution.

6. The apparatus of claim 3 wherein said laser means comprises
   a laser, and a mirror, said mirror located on a line intersecting said lens and said hologram, said laser directed to illuminate said mirror.

7. Apparatus for producing a hologram useful in a flat field scanning device comprising:
   a circular cylindrical drum having at least a transparent segment and means for rotating said drum about its central axis,
   optically responsive means for recording a hologram located on said transparent segment of said drum,
   a pair of coherent light sources each having a virtual source on a line intersecting said axis, one of said virtual sources lying inside said drum, said one virtual source offset from said central axis.

8. A method of scanning a flat field comprising the steps of
   (a) recording a hologram on a segment of a circular cylinder by interfering a pair of coherent light sources each providing light beams of aperture A at said segment;
   (b) illuminating at least a portion of said hologram with a third source of wavelength equal to said coherent light sources, said third source having, at said segment, an aperture $B<A$ and a virtual source offset from the axis of said cylinder segment, and
   (c) rotating said cylinder.

9. The method of claim 8 wherein said step (a) further comprises
   locating one of said sources inside said cylinder with a virtual source offset from the axis of said cylinder.

10. The method of claim 8 which provides for repetitive scanning of said field and in which plural holograms are recorded in different segments of said cylinder in a band and said third source illuminates different holograms, in turn, as said cylinder is rotated.

11. The method of claim 8 which comprises the further step of
    (d) providing at least one aperture stop to limit the portion of said hologram illuminated by said third source.

12. The method of claim 11 in which said at least one aperture stop is located to provide a diffraction limit to resolution equal to the aberration limit to resolution.

13. The method of claim 9 in which said offsets are selected to provide a scanned line straight to within $\pm 5\%$ of a radius of said cylinder.

* * * * *